US012755977B2

(12) United States Patent
Arai et al.

(10) Patent No.: US 12,755,977 B2
(45) Date of Patent: Oct. 6, 2026

(54) ELECTRODE MIXTURE, SECONDARY BATTERY, AND COMPOSITION

(71) Applicants: DAIKIN INDUSTRIES, LTD., Osaka (JP); DAIKIN FLUOROCHEMICALS (CHINA) CO., LTD., Changshu (CN)

(72) Inventors: Kanako Arai, Osaka (JP); Ryouichi Yano, Osaka (JP); Yuki Yotsumoto, Changshu (CN); Pei Qi Liu, Changshu (CN); En Hao Zhang, Changshu (CN)

(73) Assignees: DAIKIN INDUSTRIES, LTD., Osaka (JP); DAIKIN FLUOROCHEMICALS (CHINA) CO., LTD., Jiangsu (CN)

( * ) Notice: Subject to any disclaimer, the term of this patent is extended or adjusted under 35 U.S.C. 154(b) by 785 days.

(21) Appl. No.: 18/178,165

(22) Filed: Mar. 3, 2023

(65) Prior Publication Data

US 2024/0088392 A1 Mar. 14, 2024

Related U.S. Application Data

(63) Continuation of application No. PCT/JP2021/031178, filed on Aug. 25, 2021.

(30) Foreign Application Priority Data

Sep. 4, 2020 (CN) ........................ 202010920312.X

(51) Int. Cl.
*H01M 4/62* (2006.01)
*C08L 27/16* (2006.01)

(52) U.S. Cl.
CPC ............. *H01M 4/623* (2013.01); *C08L 27/16* (2013.01)

(58) Field of Classification Search
CPC .......... H01M 4/623; C08L 27/16; C08L 27/18
See application file for complete search history.

(56) References Cited

U.S. PATENT DOCUMENTS

| | | | | |
|---|---|---|---|---|
| 6,051,343 | A | 4/2000 | Suzuki et al. | |
| 12,002,961 | B2 * | 6/2024 | Park | H01M 4/667 |
| 2010/0261057 | A1 | 10/2010 | Shibuya | |
| 2015/0137028 | A1 | 5/2015 | Ichisaka et al. | |
| 2015/0137029 | A1 | 5/2015 | Ichisaka et al. | |
| 2019/0393509 | A1 * | 12/2019 | Lee | H01M 4/13 |
| 2020/0127281 | A1 * | 4/2020 | Moon | H01M 4/13 |
| 2020/0243862 | A1 | 7/2020 | Hosoda et al. | |
| 2020/0403246 | A1 | 12/2020 | Takeda et al. | |
| 2021/0198453 | A1 | 7/2021 | Suzuki et al. | |
| 2021/0305576 | A1 | 9/2021 | Konishi et al. | |

FOREIGN PATENT DOCUMENTS

| | | | | |
|---|---|---|---|---|
| CN | 104285320 | A | 1/2015 | |
| CN | 111194495 | A | 5/2020 | |
| JP | 53-134876 | A | 11/1978 | |
| JP | 10-154415 | A | 6/1998 | |
| JP | 2001-023618 | A | 1/2001 | |
| JP | 2001-223011 | A | 8/2001 | |
| JP | 2004-281096 | A | 10/2004 | |
| JP | 2010-123331 | A | 6/2010 | |
| JP | 2010-244936 | A | 10/2010 | |
| JP | 6529700 | B1 | 6/2019 | |
| JP | 2019149299 | A * | 9/2019 | H01M 4/62 |
| JP | 2019-200894 | A | 11/2019 | |
| WO | 2019/167322 | A1 | 9/2019 | |
| WO | 2019/220676 | A1 | 11/2019 | |
| WO | 2020/054210 | A1 | 3/2020 | |
| WO | 2020/054615 | A1 | 3/2020 | |

OTHER PUBLICATIONS

Machine translation of JP2001-223011 (no date) (Year: 0000).*
Machine translation of JP 2010-123331 (no date) (Year: 0000).*
Extended European Search Report dated Jul. 8, 2025, issued in European Application No. 21864206.4.
International Preliminary Report on Patentability (with translation of Written Opinion) dated Mar. 7, 2023, issued in International Application No. PCT/JP2021/031178.
International Search Report for PCT/JP2021/031178 dated Oct. 26, 2021 [PCT/ISA/210].

* cited by examiner

*Primary Examiner* — Amanda C. Walke
(74) *Attorney, Agent, or Firm* — Sughrue Mion, PLLC

(57) ABSTRACT

Provided is an electrode mixture including: an electrode active material; an organic solvent; a binder; and an additive; wherein the binder contains a fluorine-containing copolymer containing a vinylidene fluoride unit and a fluorinated monomer unit, provided that the vinylidene fluoride unit is excluded from the fluorinated monomer unit; the additive is a polymer material containing the following repeating unit: $—[CH_2—CHR]—$ wherein R is a chain or cyclic amide group, a nitrile group, or a substituted alkyl group formed by substituting at least one of hydrogen atoms of an alkyl group having 1 to 4 carbon atoms with a chain or cyclic amide group or a nitrile group; a content of the binder is 0.1 to 1.6 parts by mass with respect to 100 parts by mass of the electrode active material; and a content of the additive is 0.001 to 0.2 parts by mass with respect to 100 parts by mass of the electrode active material.

11 Claims, No Drawings

ELECTRODE MIXTURE, SECONDARY BATTERY, AND COMPOSITION

CROSS-REFERENCE TO RELATED APPLICATIONS

This application is a Rule 53(b) Continuation of International Application No. PCT/JP2021/031178 filed Aug. 25, 2021, which claims priority based on Chinese Patent Application No. 202010920312.X filed Sep. 4, 2020, the respective disclosures of which are incorporated herein by reference in their entirety.

TECHNICAL FIELD

The present disclosure relates to an electrode mixture, a secondary battery, and a composition.

BACKGROUND ART

Non-aqueous electrolyte secondary batteries such as lithium ion secondary batteries are used for small electric/electronic devices suitable for carrying such as laptop computers, mobile phones, smartphones, tablet personal computers, and ultrabooks, because of their high voltage, high energy density, low self-discharge, low memory effect, and ultra-lightweight, and they are further being put to practical use as a wide range of power sources such as in-vehicle power sources for driving automobiles or the like and large stationary power sources.

As an electrode mixture for forming an electrode of such a non-aqueous electrolytic solution secondary battery, Patent Literature 1 discloses an electrode mixture comprising: a binder composition; a solvent; and an electrode active material wherein the binder composition comprises a vinylidene fluoride polymer and a polymer additive, the vinylidene fluoride polymer comprises a vinylidene fluoride copolymer containing a structural unit derived from vinylidene fluoride and a structural unit derived from chlorotrifluoroethylene, and the polymer additive is a polymer material containing the following repeating unit:

$$—[CH_2—CHR]—$$

wherein R represents a chain or cyclic amide group, a nitrile group, a hydroxy group, an ester-containing group, or a substituted alkyl group formed by substituting at least one of the hydrogen atoms of an alkyl group having 1 to 4 carbon atoms with a chain or cyclic amide group, a nitrile group, or a hydroxy group, for example.

Further, Patent Literature 2 discloses a positive electrode for a lithium secondary battery, and the electrode is produced by the steps of dispersing carbon black as a conductive additive in a solvent with polyvinylpyrrolidone as a dispersant using a high-pressure jet mill to prepare a carbon black-containing dispersion, mixing the resulting carbon black-containing dispersion with at least a positive electrode active material containing lithium to prepare a coating material for forming a coating film as a positive electrode, and applying the resulting coating material for forming a coating film as a positive electrode to a current collector, followed by drying.

CITATION LIST

Patent Literature

Patent Literature 1: WO 2019/167322

Patent Literature 2: Japanese Patent Application Laid-Open No. 2004-281096

SUMMARY

The present disclosure provides an electrode mixture comprising: an electrode active material; an organic solvent; a binder; and an additive, wherein the binder comprises a fluorine-containing copolymer comprising a vinylidene fluoride unit and a fluorinated monomer unit, provided that the vinylidene fluoride unit is excluded from the fluorinated monomer unit; the additive is a polymer material containing the following repeating unit:

$$—[CH_2—CHR]—$$

wherein R represents a chain or cyclic amide group, a nitrile group, or a substituted alkyl group formed by substituting at least one of hydrogen atoms of an alkyl group having 1 to 4 carbon atoms with a chain or cyclic amide group or a nitrile group; a content of the binder is 0.1 to 1.6 parts by mass with respect to 100 parts by mass of the electrode active material; and a content of the additive is 0.001 to 0.2 parts by mass with respect to 100 parts by mass of the electrode active material.

Effect

The present disclosure can provide an electrode mixture having a viscosity unlikely to increase, capable of forming an electrode mixture layer that is excellent in adhesion to a current collector and flexibility, and capable of forming a secondary battery having sufficient load characteristics.

DESCRIPTION OF EMBODIMENTS

Hereinafter, specific embodiments of the present disclosure will be described in detail, but the present disclosure is not limited to the following embodiments.

The electrode mixture of the present disclosure comprises an electrode active material, an organic solvent, a binder, and an additive.

<Electrode Active Material>

The electrode active material contained in the electrode mixture of the present disclosure may be a positive electrode active material or a negative electrode active material. The positive electrode active material is not limited, as long as it is capable of electrochemically absorbing/desorbing lithium ions; however, the positive electrode active material is preferably a lithium composite oxide, more preferably a lithium transition metal composite oxide, since the capacity of the secondary battery can be increased. The positive electrode active material is preferably a lithium-containing transition metal phosphate compound, as well. It is also preferable that the positive electrode active material be a substance containing lithium and at least one transition metal, such as a lithium transition metal composite oxide and a lithium-containing transition metal phosphate compound.

The transition metal of the lithium transition metal composite oxide is preferably V, Ti, Cr, Mn, Fe, Co, Ni, Cu, or the like. Specific examples of the lithium transition metal composite oxide include a lithium-cobalt composite oxide such as $LiCoO_2$, a lithium-nickel composite oxide such as $LiNiO_2$, a lithium-manganese composite oxide such as $LiMnO_2$, $LiMn_2O_4$, and $Li_2MnO_3$, and those obtained by substituting some of the transition metal atoms, as the main components, of these lithium-transition metal composite oxides with other metals such as Al, Ti, V, Cr, Mn, Fe, Co, Li, Ni, Cu, Zn, Mg, Ga, Zr, and Si. Examples of these substituted product include lithium-nickel-manganese composite oxides, lithium-nickel-cobalt-aluminum composite oxides, lithium-nickel-cobalt-manganese composite oxides, lithium-manganese-aluminum composite oxides, and lithium-titanium composite oxides. More specifically, examples thereof include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, $LiMn_{1.8}Al_{0.2}O_4$, $LiMn_{1.5}Ni_{0.5}O_4$, $Li_4Ti_5O_{12}$, and $LiNi_{0.82}Co_{0.15}Al_{0.03}O_2$.

The transition metal of a lithium-containing transition metal phosphate compound is preferably V, Ti, Cr, Mn, Fe, Co, Ni, Cu, or the like. Specific examples of the lithium-containing transition metal phosphate compound include iron phosphates such as $LiFePO_4$, $Li_3Fe_2$ $(PO_4)_3$, and $LiFeP_2O_7$, cobalt phosphates such as $LiCaPO_4$, and those obtained by substituting some of the transition metal atoms, as the main components, of these lithium transition metal phosphate compounds with other metals such as Al, Ti, V, Cr, Mn, Fe, Co, Li, Ni, Cu, Zn, Mg, Ga, Zr, Nb, and Si.

The positive electrode active material is preferably at least one selected from the group consisting of lithium-cobalt composite oxides, lithium-nickel composite oxides, lithium-manganese composite oxides, iron phosphates, lithium-nickel-manganese composite oxides, lithium-nickel-cobalt-manganese composite oxides, and lithium-nickel-cobalt-aluminum composite oxides, more preferably at least one selected from the group consisting of lithium-cobalt composite oxides, lithium-nickel composite oxides, lithium-manganese composite oxides, lithium-nickel-manganese composite oxides, lithium-nickel-cobalt-manganese composite oxides, and lithium-nickel-cobalt-aluminum composite oxides, in view of forming an electrode mixture layer that is furthermore excellent in adhesion to a current collector.

The positive electrode active material is preferably at least one selected from the group consisting of $LiCoO_2$, $LiNiO_2$, $LiMn_2O_4$, $LiFePO_4$, $LiNi_{0.33}Mn_{0.33}Co_{0.33}O_2$, $LiNi_{0.5}Mn_{0.3}Co_{0.2}O_2$, $LiNi_{0.82}Co_{0.15}Al_{0.03}O_2$, $LiNi_{0.6}Mn_{0.2}Co_{0.2}O_2$, $LiNi_{0.8}Mn_{0.1}Co_{0.1}O_2$, and $LiNi_{0.90}Mn_{0.05}Co_{0.05}O_2$.

Among the lithium-containing transition metal composite oxides, lithium-nickel composite oxides are preferable, and more preferred is a lithium-nickel composite oxide represented by Formula (1):

$$Li_yNi_{1-x}M_xO_2 \quad \text{Formula (1):}$$

wherein x is $0.01 \le x \le 0.5$, y is $0.9 \le y \le 1.2$, and M represents a metal atom (provided that Li and Ni are excluded from the metal atom). Such a lithium-containing transition metal oxide containing a large amount of Ni is beneficial for increasing the capacity of the secondary battery. The electrode mixture of the present disclosure has a viscosity unlikely to increase and excellent coatability, even when containing a lithium-containing transition metal oxide containing a large amount of Ni as an electrode active material.

In Formula (1), x is a coefficient satisfying $0.01 \le x \le 0.5$, preferably $0.05 \le x \le 0.4$, further preferably $0.10 \le x \le 0.3$, in view of obtaining secondary batteries with higher capacity.

In Formula (1), examples of the metal atom represented by M include V, Ti, Cr, Mn, Fe, Co, Cu, Al, Zn, Mg, Ga, Zr, and Si. The metal atom represented by M is preferably a transition metal such as V, Ti, Cr, Mn, Fe, Co, and Cu, or a combination of the transition metal with another metal such as Al, Ti, V, Cr, Mn, Fe, Co, Cu, Zn, Mg, Ga, Zr, and Si.

The lithium-nickel composite oxide represented by Formula (1) is preferably at least one selected from the group consisting of $LiNi_{0.80}Co_{0.15}Al_{0.05}O_2$, $LiNi_{0.82}Co_{0.15}Al_{0.03}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, and $LiNi_{0.90}Mn_{0.05}Co_{0.05}O_2$, more preferably at least one selected from the group consisting of $LiNi_{0.82}Co_{0.15}Al_{0.03}O_2$, $LiNi_{0.6}Mn_{0.2}Co_{0.2}O_2$, and $LiNi_{0.8}Mn_{0.1}Co_{0.1}O_2$.

The lithium-nickel composite oxide represented by Formula (1) may be combined with a different positive electrode active material. Specifically, examples of the different positive electrode active material include $LiCoO_2$, $LiMnO_2$, $LiMn_2O_4$, $Li_2MnO_3$, $LiMn_{1.8}Al_{0.2}O_4$, $Li_4Ti_5O_{12}$, $LiFePO_4$, $Li_3Fe_2$ $(PO_4)_3$, $LiFeP_2O_7$, $LiCoPO_4$, $Li_{1.2}Fe_{0.4}Mn_{0.4}O_2$, and $LiNiO_2$.

The positive electrode active material used can be such a positive electrode active material having a surface onto which another substance is attached, the substance having compositional features different from that of the substance forming the main positive electrode active material. Examples of the substance attached to the surface include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

Such a surface-attached substance can be attached onto the surface of the positive electrode active material, for example, by a method including dissolving or suspending the substance in a solvent and impregnating the positive electrode active material with the solution to add the substance thereto, followed by drying, a method including dissolving or suspending a precursor of the substance in a solvent, impregnating the positive electrode active material with the solution to add the substance thereto, and causing a reaction by heating or the like, or a method including adding the substance to a precursor of the positive electrode active material and firing together.

The amount of the surface-attached substance to be used is preferably 0.1 ppm or more, more preferably 1 ppm or more, further preferably 10 ppm or more, for the lower limit, and is preferably 20% or less, more preferably 10% or less, further preferably 5% or less, for the upper limit, with respect to the mass of the positive electrode active material. The surface-attached substance can suppress oxidation reaction of the non-aqueous electrolyte on the surface of the positive electrode active material to improve the lifetime of the battery. However, in the case where the amount attached is excessively small, the effect is not sufficiently exerted, and in the case where the amount is excessively large, the resistance may increase because it inhibits the entry and exit of lithium ions.

Examples of the shape of the particles of the positive electrode active material to be used include bulk, polyhedral, spherical, ellipsoidal, plate, needle, and columnar shapes, as conventionally used. In particular, a positive electrode active material in which primary particles aggregate to form spherical or ellipsoidal secondary particles is preferable. Generally, since the active material in the electrode expands and contracts with charge and discharge of electrochemical elements, deterioration such as destruction of the active material and breakage of the conductive path due to the stress is likely to occur. Therefore, a case where primary particles aggregate to form secondary particles is more preferable than a case where an active material consists of single particles, which are primary particles, in view of relieving the stress of expansion and contraction to prevent deterioration. Further, it is preferable that the particles have a spherical or ellipsoidal shape rather than a plate shape or the like that tend to be axially oriented. The particles having a spherical or ellipsoidal shape are unlikely to be oriented when forming an electrode to result in small expansion and contraction of the electrode during charging and discharging, and it is also easy to uniformly mix the particles having a spherical or ellipsoidal shape with a conductive additive when producing the electrode.

The positive electrode active material generally has a tapped density of 1.3 $g/cm^3$ or more, preferably 1.5 $g/cm^3$ or more, further preferably 1.6 $g/cm^3$ or more, most preferably 1.7 $g/cm^3$ or more. When the tapped density of the positive electrode active material falls below such a lower limit, the amount of the dispersion medium necessary for forming the positive electrode mixture layer increases, and the necessary amounts of the conductive additive and binder also increase, so that the filling ratio of the positive electrode active material in the positive electrode mixture layer may be restricted to thereby restrict the battery capacity. Use of a metal composite oxide powder with high tapped density enables forming a high-density positive electrode mixture layer. Generally, the higher the tapped density, the more preferable it is, and there is no particular upper limit. However, an excessively high tapped density may be a rate-determining factor of the diffusion of lithium ions through the non-aqueous electrolyte in the positive electrode mixture layer to result in deterioration in the load characteristics. Therefore, the tapped density is generally 2.5 $g/cm^3$ or less, preferably 2.4 $g/cm^3$ or less.

The tapped density of the positive electrode active material is defined as a density determined from the volume and the weight of a sample measured by passing the sample through a sieve with an opening size of 300 μm and dropping into a 20-cm 3 tapping cell to fill the cell capacity and thereafter performing tapping with a stroke length of 10 mm 1,000 times using a powder density-measuring instrument (such as a tap denser, available from Seishin Enterprise Co., Ltd).

The particles of the positive electrode active material have a median diameter d50 (the size of secondary particles, in the case where primary particles aggregate to form secondary particles) of generally 0.1 μm or more, preferably 0.5 μm or more, more preferably 1 μm or more, most preferably 3 μm or more, and generally 20 μm or less, preferably 18 μm or less, more preferably 16 μm or less, most preferably 15 μm or less. When the diameter falls below such a lower limit, a product with high bulk density cannot be obtained. When the diameter exceeds such an upper limit, diffusion of lithium within the particles takes time, so that the battery performance may decrease, or problems such as streaks may occur when producing the positive electrode of the battery, that is, when the active material is slurried together with a conductive additive, a binder, or the like in a solvent and applied in a form of a thin film. Here, two or more positive electrode active materials having different median diameters d50 can also be mixed to further improve the filling property when producing the positive electrode.

The median diameter d50 in the present disclosure is measured using a known laser diffraction/scattering particle size distribution measurement apparatus. In the case of using LA-920, available from HORIBA, Ltd., as a particle size distribution analyzer, measurement is performed by setting the measurement refractive index to 1.24, after ultrasonic dispersion for 5 minutes using a 0.1-mass % sodium hexametaphosphate aqueous solution as a dispersion medium used in measurement.

In the case where primary particles aggregate to form secondary particles, the primary particles of the positive electrode active material have an average diameter of generally 0.01 μm or more, preferably 0.05 μm or more, further preferably 0.08 μm or more, most preferably 0.1 μm or more, and generally 3 μm or less, preferably 2 μm or less, further preferably 1 μm or less, most preferably 0.6 μm or less. When the average diameter exceeds such an upper limit, it is difficult to form spherical secondary particles, thereby adversely affecting the powder filling property or greatly reducing the specific surface area, which may increase the possibility of reduction in battery performance such as output characteristics. Conversely, when the average diameter falls below such a lower limit, problems such as inferior charge/discharge reversibility may occur because the crystals are generally underdeveloped. The diameter of the primary particles is measured by observation using a scanning electron microscope (SEM). Specifically, the diameter is determined by determining the maximum length between the left and right boundaries along the horizontal straight line in an image at a magnification of 10,000 for each of any 50 primary particles and averaging the values.

The positive electrode active material has a BET specific surface area of generally 0.2 $m^2/g$ or more, preferably 0.3 $m^2/g$ or more, further preferably 0.4 $m^2/g$ or more, and generally 4.0 $m^2/g$ or less, preferably 2.5 $m^2/g$ or less, further preferably 1.5 $m^2/g$ or less. When the BET specific surface area falls below such a range, the battery performance tends to decrease. When it exceeds the range, the tapped density is unlikely to be large, so that problems with the coating property when forming the positive electrode mixture layer may easily occur.

The BET specific surface area is defined as a value measured for a sample pre-dried under nitrogen circulate at 150° C. for 30 minutes using a surface area meter (for example, a fully automatic surface area measuring device, available from Ohkura Riken Co., Ltd.) by the single point BET nitrogen adsorption by the gas flow method using a nitrogen-helium mixed gas accurately adjusted so that the relative pressure value of nitrogen to the atmospheric pressure is 0.3.

A method that is common as a method for producing an inorganic compound is used as the method for producing the positive electrode active material. In particular, various methods are conceivable for producing a spherical or ellipsoidal active material. Examples thereof include: a method for obtaining an active material by dissolving or milling and dispersing a transition metal raw material such as transition metal nitrates and sulfates together with raw materials of other elements, as needed, in a solvent such as water, adjusting the pH under stirring to produce a spherical precursor, recovering it, followed by drying, as required, thereafter adding a Li source such as LiOH, $Li_2CO_3$, and $LiNO_3$ thereto, and firing the mixture at a high temperature; a method for obtaining an active material by dissolving or milling and dispersing a transition metal raw material such as transition metal nitrates, sulfates, hydroxides, and oxides together with raw materials of other elements, as needed, in a solvent such as water, subjecting the resultant to drying and forming with a spray dryer or the like to produce a spherical or ellipsoidal precursor, adding a Li source such as LiOH, $Li_2CO_3$, and $LiNO_3$ thereto, and firing the mixture at a high temperature; and a method for obtaining an active material by dissolving or milling and dispersing a transition metal raw material such as transition metal nitrates, sulfates, hydroxides, and oxides together with a Li source such as LiOH, $Li_2CO_3$, and $LiNO_3$ and raw materials of other elements, as needed, in a solvent such as water, subjecting the resultant to drying and forming with a spray dryer or the like to produce a spherical or ellipsoidal precursor, and firing the precursor at a high temperature.

In the present disclosure, one of these positive electrode active material powders may be used alone, or two or more of them having different compositional features or different powder physical properties may be used in any combination and any ratio.

The negative electrode active material is not limited, as long as it is capable of electrochemically absorbing/desorbing lithium ions, and examples thereof include carbonaceous materials, metal oxides such as tin oxide and silicon oxide, metal composite oxides, elemental lithium and lithium alloys such as lithium aluminum alloy, and metals capable of forming alloys with lithium such as Sn and Si. One of these may be used alone, or two or more of them may be used in any combination and any ratio. Among these, carbonaceous materials or lithium composite oxides are preferably used in view of the safety.

Such a metal composite oxide is not limited, as long as it is capable of absorbing/desorbing lithium; however, the metal composite oxide preferably contains titanium and/or lithium as a structural component for high-current density charge/discharge characteristics.

The metal composite oxide is preferably a lithium-containing transition metal composite oxide, and examples thereof include the lithium-nickel composite oxide represented by Formula (1) described above, and also lithium titanates such as $Li_{4+x}Ti_5O_{12}$ ($0 \leq x \leq 3$) having a spinel structure and $Li_{2+y}Ti_3O_7$ ($0 \leq y \leq 3$) having a ramsdellite structure.

As a carbonaceous material, one selected from (1) natural graphite, (2) artificial carbonaceous substances and artificial graphite substances; carbonaceous materials obtained by carbonaceous substances {for example, natural graphite, coal coke, petroleum coke, coal pitch, petroleum pitch, or oxidized pitch of these, needle coke, pitch coke, and carbonate materials obtained by partially graphitizing these, furnace black, acetylene black, pyrolyzates of organic substances such as pitch carbon fibers, carbonizable organic substances (for example, coal heavy oil such as coal tar pitch from soft pitch to hard pitch or liquefied oil by dry distillation, normal-pressure residual oil, straight-run heavy oil of vacuum residual oil, crude oil, cracked petroleum heavy oil such as ethylene tar, which is a by-product of pyrolysis of naphtha or the like, further aromatic hydrocarbons such as acenaphthylene, decacyclene, anthracene, and phenanthrene, N-ring compounds such as phenazine and acridine, S-ring compounds such as thiophene and bithiophene, polyphenylenes such as biphenyl and terphenyl, polyvinyl chloride, polyvinyl alcohol, polyvinyl butyral, insolubilized products of these, organic polymers such as nitrogen-containing polyacrylonitrile and polypyrrole, organic polymers such as sulfur-containing polythiophene and polystyrene, natural polymers of polysaccharides typified by cellulose, lignin, mannan, polygalacturonic acid, chitosan, and saccharose, thermoplastic resins such as polyphenylene sulfide and polyphenylene oxide, and thermosetting resins such as furfuryl alcohol resin, phenol-formaldehyde resin, and imide resin) and carbides of these, or solutions obtained by dissolving carbonizable organic substances in low-molecular weight organic solvents such as benzene, toluene, xylene, quinoline, and n-hexane, and carbides of these} heated once or more in the range of 400 to 3200° C., (3) a carbonaceous material in which a negative electrode mixture layer consists of carbonaceous matter having at least two or more different crystallinities and/or having an interface where the carbonaceous matter with different crystallinities is in contact, and (4) a carbonaceous material in which a negative electrode mixture layer consists of carbonaceous matter having at least two or more different orientations and/or having an interface where the carbonaceous matter with different orientations is in contact is preferable because of good balance between initial irreversible capacity and high-current density charge/discharge characteristics.

The content of an electrode active material (positive electrode active material or negative electrode active material) in the electrode mixture is preferably 40 mass % or more, in view of increasing the capacity of the electrode to be obtained.

The content of the electrode active material in the positive electrode mixture of the present disclosure is preferably 96.0 to 99.0 mass %, more preferably 96.5 to 98.9 mass %, further preferably 97.0 to 98.8 mass %, with respect to the mass of the positive electrode mixture.

<Conductive Additive>

The electrode mixture of the present disclosure preferably further comprises a conductive additive. Examples of the conductive additive include carbon blacks such as acetylene black and Ketjenblack, carbon materials such as graphite, carbon fibers, carbon nanotubes, and carbon nanohorns.

The content of the conductive additive in the positive electrode mixture of the present disclosure is preferably 0.01 to 5 parts by mass, more preferably 0.05 to 3 parts by mass, further preferably 0.1 to 2 parts by mass, per 100 parts by mass of the positive electrode active material.

<Organic Solvent>

The electrode mixture of the present disclosure further contains an organic solvent. Examples of the organic solvent can include nitrogen-containing organic solvents such as N-methyl-2-pyrrolidone, N,N-dimethylacetamide, and dimethylformamide; ketone solvents such as acetone, methyl ethyl ketone, cyclohexanone, and methyl isobutyl ketone; ester solvents such as ethyl acetate and butyl acetate; ether solvents such as tetrahydrofuran and dioxane; β-alkoxypropionamides such as β-methoxy-N,N-dimethylpropionamide, β-n-butoxy-N,N-dimethylpropionamide, and β-n-hexyloxy-N,N-dimethylpropionamide; and general-purpose organic solvents with a low boiling point such as mixed solvents thereof. Among these, the solvent is preferably at least one selected from the group consisting of N,N-dimethylformamide, N,N-dimethylacetamide, N-methyl-2-pyrrolidone, N-ethyl-2-pyrrolidone, and β-alkoxypropionamides, more preferably at least one selected from the group consisting of N-methyl-2-pyrrolidone and N,N-dimethylacetamide, in view of obtaining excellent coating properties.

<Binder>

The binder contained in the electrode mixture of the present disclosure comprises a fluorine-containing copolymer comprising a vinylidene fluoride unit (VdF unit) and a fluorinated monomer unit (provided that the VdF unit is excluded from the fluorinated monomer unit). The electrode mixture of the present disclosure can form an electrode mixture layer that sufficiently adheres well to the current collector since it comprises the fluorine-containing copolymer containing a VdF unit and a fluorinated monomer unit as a binder. The electrode mixture can also easily form an electrode mixture layer since it has a viscosity unlikely to increase and excellent coatability, and furthermore, the electrode mixture can improve the flexibility of the electrode mixture layer.

Examples of the fluorinated monomer (provided that the VdF is excluded from the fluorinated monomer) include tetrafluoroethylene (TFE), vinyl fluoride, trifluoroethylene, chlorotrifluoroethylene (CTFE), fluoroalkyl vinyl ether, hexafluoropropylene (HFP), (perfluoroalkyl)ethylene, 2,3,3,3-tetrafluoropropene, and trans-1,3,3,3-tetrafluoropropene. Among these, at least one selected from the group consisting of TFE, CTFE, HFP, fluoroalkyl vinyl ether, and 2,3,3,3-tetrafluoropropene is preferable, at least one selected from the group consisting of TFE, CTFE, fluoroalkyl vinyl ether, and HFP is more preferable, at least one selected from the group consisting of TFE and HFP is further preferable, and TFE is particularly preferable, in view of further suppressing the increase in viscosity of the electrode mixture, and forming an electrode mixture layer that is further excellent in adhesion to a current collector and flexibility.

The fluoroalkyl vinyl ether (FAVE) is preferably fluoroalkyl vinyl ether having a fluoroalkyl group having 1 to 5 carbon atoms, more preferably at least one selected from the group consisting of perfluoro(methyl vinyl ether), perfluoro (ethyl vinyl ether), and perfluoro(propyl vinyl ether).

The fluorinated monomer unit (provided that the VdF unit is excluded from the fluorinated monomer unit) may or may not have a polar group.

The content of the VdF unit in the fluorine-containing copolymer is preferably 50.0 to 99.0 mol %, more preferably 57.0 mol % or more, further preferably 60.0 mol % or more, particularly preferably 63.0 mol % or more, and more preferably 97.0 mol % or less, further preferably 95.0 mol % or less, particularly preferably 90.0 mol % or less, most preferably 85.0 mol % or less, with respect to all monomer units, in view of further suppressing the increase in viscosity of the electrode mixture, and forming an electrode mixture layer that is further excellent in adhesion to a current collector and flexibility.

The content of the fluorinated monomer unit (provided that VdF unit is excluded from the fluorinated monomer unit) in the fluorine-containing copolymer is preferably 1.0 mol % or more, more preferably 3.0 mol % or more, further preferably 5.0 mol % or more, particularly preferably 10.0 mol % or more, most preferably 15.0 mol % or more, and preferably 50.0 mol % or less, more preferably 43.0 mol % or less, further preferably 40.0 mol % or less, particularly preferably 37.0 mol % or less, with respect to all monomer units.

In the present disclosure, the compositional features of the fluorine-containing copolymer can be determined, for example, by $^{19}$F-NMR measurement.

The fluorine-containing copolymer may further contain a non-fluorinated monomer unit. Examples of the non-fluorinated monomer include non-fluorinated monomers having no polar group such as ethylene and propylene, and non-fluorinated monomers having a polar group (which may be hereinafter referred to as polar group-containing monomers).

Use of a non-fluorinated monomer having a polar group allows the polar group to be introduced into the fluorine-containing copolymer, whereby more excellent adhesion between the electrode mixture layer and the current collector is obtained. The polar group that can be contained in the fluorine-containing copolymer is preferably at least one selected from the group consisting of a carbonyl group-containing group, an epoxy group, a hydroxy group, a sulfonate group, a sulfate group, a phosphate group, an amino group, an amide group, and an alkoxy group, more preferably at least one selected from the group consisting of a carbonyl group-containing group, an epoxy group, and a hydroxy group, further preferably a carbonyl group-containing group. The aforementioned hydroxy group does not include the hydroxy group as a part of the aforementioned carbonyl group-containing group. Further, the aforementioned amino group is a monovalent functional group obtained by removing hydrogen from ammonia or primary or secondary amine.

The aforementioned carbonyl group-containing group is a functional group having a carbonyl group (—C(═O)—). The aforementioned carbonyl group-containing group is preferably a carboxylic acid anhydride group or a group represented by Formula: —COOR, wherein R represents a hydrogen atom, an alkyl group, or a hydroxyalkyl group. The alkyl group and the hydroxyalkyl group preferably have 1 to 16, more preferably 1 to 6, further preferably 1 to 3 carbon atoms. Specifically, examples of the group represented by Formula: —COOR include $—COOCH_2CH_2OH$, $—COOCH_2CH(CH_3)OH$, $—COOCH(CH_3)CH_2OH$, —COOH, $—COOCH_3$, and $—COOC_2H_5$. In the case where the group represented by Formula: —COOR is —COOH or contains —COOH, —COOH may be a carboxylate such as a carboxylate metal salt and ammonium carboxylate.

Further, the carbonyl group-containing group may be a group represented by Formula: —X—COOR, wherein X is an atomic group having the main chain composed of 2 to 15 atoms, the molecular weight of the atomic group is preferably 350 or less, and R represents a hydrogen atom, an alkyl group, or a hydroxyalkyl group. The alkyl group and the hydroxyalkyl group preferably have 1 to 16, more preferably 1 to 6, further preferably 1 to 3 carbon atoms.

The aforementioned amide group is preferably a group represented by Formula: —CO—NRR', wherein R and R' each independently represent a hydrogen atom or a substituted or unsubstituted alkyl group, or a bond represented by Formula: —CO—NR"—, wherein R" represents a hydrogen atom, a substituted or unsubstituted alkyl group, or a substituted or unsubstituted phenyl group.

Examples of the aforementioned polar group-containing monomer include hydroxyalkyl (meth)acrylates such as hydroxyethyl acrylate and 2-hydroxypropyl acrylate; alkylidene malonates such as dimethyl methylidene malonate; vinyl carboxyalkyl ethers such as vinyl carboxymethyl ether and vinyl carboxyethyl ether; carboxyalkyl (meth)acrylates such as 2-carboxyethyl acrylate and 2-carboxyethyl methacrylate; (meth)acryloyloxyalkyl dicarboxylic acid esters such as acryloyloxyethyl succinic acid, acryloyloxypropyl succinic acid, methacryloyloxyethyl succinic acid, acryloyloxyethyl phthalic acid, and methacryloyloxyethyl phthalic acid; unsaturated dibasic acid monoesters such as monomethyl maleate ester, monoethyl maleate ester, citraconic acid monomethyl ester, and citraconic acid monoethyl ester; and a monomer (2) represented by Formula (2):

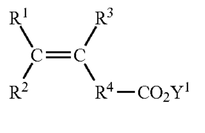

wherein $R^1$ to $R^3$ each independently represent a hydrogen atom or a hydrocarbon group having 1 to 8 carbon atoms, $R^4$ represents a single bond or a hydrocarbon group having 1 to 8 carbon atoms, and $Y^1$ represents an inorganic cation and/or an organic cation.

The polar group-containing monomer unit that can be contained in the fluorine-containing copolymer is preferably a unit based on monomer (2) represented by Formula (2).

In Formula (2), $Y^1$ represents an inorganic cation and/or an organic cation. Examples of the inorganic cation include cations such as H, Li, Na, K, Mg, Ca, Al, and Fe. Examples of the organic cation include cations such as $NH_4$, $NH_3R^5$, $NH_2R^5{}_2$, $NHR^5{}_3$, $NR^5{}_4$, wherein each $R^5$ independently represents an alkyl group having 1 to 4 carbon atoms. $Y^1$ is preferably H, Li, Na, K, Mg, Ca, Al, or $NH_4$, more preferably H, Li, Na, K, Mg, Al, or $NH_4$, further preferably H, Li, Al, or $NH_4$, particularly preferably H. In the specific examples of the inorganic cation and the organic cation above described, the reference numerals and valences are omitted for convenience of description.

In Formula (2), $R^1$ to $R^3$ each independently represent a hydrogen atom or a hydrocarbon group having 1 to 8 carbon atoms. The hydrocarbon group is a monovalent hydrocarbon group. The hydrocarbon group preferably has 4 or less carbon atoms. Examples of the hydrocarbon group include an alkyl group, an alkenyl group, and an alkynyl group having the aforementioned number of carbon atoms, and a methyl group or an ethyl group are preferable. $R^1$ and $R^2$ preferably each independently represent a hydrogen atom, a methyl group, or an ethyl group, and $R^3$ preferably represents a hydrogen atom or a methyl group.

In Formula (2), $R^4$ represents a single bond or a hydrocarbon group having 1 to 8 carbon atoms. The hydrocarbon group is a divalent hydrocarbon group. The hydrocarbon group preferably has 4 or less carbon atoms. Examples of the hydrocarbon group include an alkylene group and an alkenylene group having the aforementioned number of carbon atoms. Among these, at least one selected from the group consisting of a methylene group, an ethylene group, an ethylidene group, a propylidene group, and an isopropylidene group is preferable, and a methylene group is more preferable.

The monomer (2) is preferably at least one selected from the group consisting of (meth)acrylic acid and a salt thereof, vinyl acetic acid (3-butene acid) and a salt thereof, 3-pentenoic acid and a salt thereof, 4-pentenoic acid and a salt thereof, 3-hexene acid and a salt thereof, 4-heptenoic acid and a salt thereof, and 5-hexene acid and a salt thereof, more preferably at least one selected from the group consisting of 3-butene acid and a salt thereof, and 4-pentenoic acid and a salt thereof.

The content of the polar group-containing monomer unit in the fluorine-containing copolymer is preferably 0.05 to 2.0 mol %, more preferably 0.10 mol % or more, further preferably 0.25 mol % or more, particularly preferably 0.40 mol % or more, and more preferably 1.5 mol % or less, with respect to all monomer units.

In the present disclosure, the content of the polar group-containing monomer unit in the fluorine-containing copolymer can be measured by acid-base titration of the acid group in the case where the polar group is an acid group such as a carboxylic acid, for example.

Examples of the fluorine-containing copolymer include a VdF/TFE copolymer, a VdF/HFP copolymer, a VdF/TFE/HFP copolymer, a VdF/2,3,3,3-tetrafluoropropene copolymer, a VdF/TFE/2,3,3,3-tetrafluoropropene copolymer, a VdF/TFE/(meth)acrylic acid copolymer, a VdF/HFP/(meth)acrylic acid copolymer, a VdF/CTFE copolymer, a VdF/TFE/4-pentenoic acid copolymer, a VdF/TFE/3-butene acid copolymer, a VdF/TFE/HFP/(meth)acrylic acid copolymer, a VdF/TFE/HFP/4-pentenoic acid copolymer, a VdF/TFE/HFP/3-butene acid copolymer, a VdF/TFE/2-carboxyethyl acrylate copolymer, a VdF/TFE/HFP/2-carboxyethyl acrylate copolymer, a VdF/TFE/acryloyloxy ethyl succinic acid copolymer, a VdF/TFE/HFP/acryloyloxy ethyl succinic acid copolymer, a VdF/FAVE copolymer, a VdF/FAVE/(meth)acrylic acid copolymer, and a VdF/FAVE/2-carboxyethyl acrylate copolymer.

The fluorine-containing copolymer is preferably a fluorine-containing copolymer consisting only of a VdF unit, a TFE unit, and any non-fluorinated monomer unit.

In the case where the fluorine-containing copolymer contains a VdF unit and a TFE unit, the molar ratio of the VdF unit to the TFE unit (VdF unit/TFE unit) is preferably 50/50 to 99/1, more preferably 57/43 to 97/3, further preferably 60/40 to 95/5, particularly preferably 63/37 to 90/10, most preferably 63/37 to 85/15.

The weight-average molecular weight (in terms of polystyrene) of the fluorine-containing copolymer is preferably 50,000 to 3,000,000, more preferably 80,000 or more, further preferably 100,000 or more, particularly preferably 200,000 or more, more preferably 2,400,000 or less, further preferably 2,200,000 or less, particularly preferably 2,000,000 or less. The weight-average molecular weight can be measured by gel permeation chromatography (GPC) using dimethylformamide as a solvent.

The fluorine-containing copolymer has a number-average molecular weight (in terms of polystyrene) of preferably 20,000 to 1,500,000, more preferably 40,000 or more, further preferably 70,000 or more, particularly preferably 140,000 or more, and more preferably 1,400,000 or less, further preferably 1,200,000 or less, particularly preferably 1,100,000 or less. The number-average molecular weight can be measured by gel permeation chromatography (GPC) using dimethylformamide as a solvent.

The fluorine-containing copolymer has a melting point of preferably 100 to 170° C., more preferably 110 to 165° C., further preferably 120 to 163° C. The melting point is determined using a differential scanning calorimetry (DSC) device and is a temperature corresponding to the maximum value in the heat-of-fusion curve when the temperature is raised from 30° C. to 220° C. at a rate of 10° C./minute, thereafter lowered to 30° C. at a rate of 10° C./minute, and raised again to 220° C. at a rate of 10° C./minute.

The fluorine-containing copolymer preferably has an elongation at break of 100% or more. The elongation at break is more preferably 200% or more, further preferably 300% or more.

The elongation at break can be measured by the following method. A fluorine-containing copolymer solution obtained by dissolving the fluorine-containing copolymer in N-methyl-2-pyrrolidone (NMP) to a concentration of 10 to 20 mass % is casted onto a glass plate, dried at 100° C. for 12 hours, and further dried at 100° C. under vacuum for 12 hours, to obtain a film with a thickness of 50 to 100 μm. The film is punched into a dumbbell shape, and the elongation at break at 25° C. is measured by an autograph.

The fluorine-containing copolymer preferably has a storage modulus at 30° C. of 1,100 MPa or less and a storage modulus at 60° C. of 500 MPa or less.

The storage modulus at 30° C. of the fluorine-containing copolymer is more preferably 800 MPa or less, further preferably 600 MPa or less.

The storage modulus at 60° C. of the fluorine-containing copolymer is more preferably 350 MPa or less.

The storage modulus at 30° C. of the fluorine-containing copolymer is preferably 100 MPa or more, more preferably 150 MPa or more, further preferably 200 MPa or more.

The storage modulus at 60° C. of the fluorine-containing copolymer is preferably 50 MPa or more, more preferably 80 MPa or more, further preferably 130 MPa or more.

The storage modulus is a value measured at 30° C. and 60° C. for a sample with a length of 30 mm, a width of 5 mm, and a thickness of 50 to 100 μm by dynamic viscoelasticity using a dynamic viscoelasticity analyzer DVA220, available from IT Measurement Control Co., Ltd., under conditions of a tensile mode, a grip width of 20 mm, a measurement temperature ranging from −30° C. to 160° C., a temperature-increasing rate of 2° C./min, and a frequency of 1 Hz.

The measurement sample can be produced, for example, by dissolving the fluorine-containing copolymer in N-methyl-2-pyrrolidone (NMP) to a concentration of 10 to 20 mass % to give a fluorine-containing copolymer solution, casting the solution onto a glass plate, followed by drying at 100° C. for 12 hours and further drying at 100° C. for 12 hours under vacuum, to form a film with a thickness of 50 to 100 μm, and cutting the film to a length of 30 mm and a width of 5 mm.

The fluorine-containing copolymer has a rate of weight increase after immersion in an electrolyte at 60° C. for one week of preferably 250 mass % or less, more preferably 200 mass % or less. The rate of weight increase after immersion in an electrolyte at 60° C. for one week of the fluorine-containing copolymer is further preferably 180 mass % or less, particularly preferably 160 mass % or less, and may be 105 mass % or more.

The aforementioned rate of weight increase can be determined by the following method.

The NMP solution (8 mass %) of the fluorine-containing copolymer is casted into a glass petridish, followed by vacuum drying at 100° C. for 12 hours, to produce a fluorine-containing copolymer film with a thickness of 200 μm. The film obtained is punched into a diameter of 6 mm and put into an electrolyte (a solution obtained by dissolving $LiPF_6$ in a solvent of ethylene carbonate/ethyl methyl carbonate at 3/7 (volume ratio) to a concentration of 1 M) contained in a sample bottle, and the rate of weight increase is determined after the film is left standing at 60° C. for one week.

It is also preferable that the binder contained in the electrode mixture of the present disclosure further contain polyvinylidene fluoride (PVdF). Use of the fluorine-containing copolymer and PVdF as binders can further suppress the increase in viscosity of the electrode mixture and enables an electrode mixture layer that is further excellent in adhesion to a current collector and flexibility to be formed.

Polyvinylidene fluoride (PVdF) is a polymer containing a unit based on vinylidene fluoride (VdF) (which will be hereinafter referred to as VdF unit), and the polymer may be a VdF homopolymer consisting only of a VdF unit or a polymer containing a VdF unit and a unit based on a monomer copolymerizable with the VdF.

In the PVdF, the monomer copolymerizable with VdF is preferably a monomer different from tetrafluoroethylene (TFE). That is, the PVdF is preferably free from TFE units.

In the PVdF, examples of the monomer copolymerizable with the VdF include fluorinated monomers and non-fluorinated monomers, and fluorinated monomers are preferable. Examples of the fluorinated monomers include vinyl fluoride, trifluoroethylene, chlorotrifluoroethylene (CTFE), fluoroalkyl vinyl ether, hexafluoropropylene (HFP), (perfluoroalkyl) ethylene, 2,3,3,3-tetrafluoropropene, and trans-1,3,3,3-tetrafluoropropene. Examples of the non-fluorinated monomers include ethylene and propylene.

In the PVdF, the monomer copolymerizable with VdF is preferably at least one fluorinated monomer selected from the group consisting of CTFE, fluoroalkyl vinyl ether, HFP, and 2,3,3,3-tetrafluoropropene, more preferably at least one fluorinated monomer selected from the group consisting of CTFE, HFP and fluoroalkyl vinyl ether.

In the PVdF, the content of the monomer unit copolymerizable with VdF is preferably 0 to 5.0 mol %, more preferably 0 to 3.0 mol %, further preferably 0 to 1.0 mol %, with respect to all monomer units. In the PVdF, the content of the fluorinated monomer unit copolymerizable with VdF is preferably less than 5.0 mol %, more preferably less than 3.0 mol %, further preferably less than 1.0 mol %, with respect to all monomer units.

The content of the VdF unit in the PVdF is preferably 95.0 mol % or more, more preferably 97.0 mol % or more, further preferably 99.0 mol % or more, with respect to all monomer units. The content of the VdF unit in the PVdF is preferably more than 95.0 mol %, more preferably more than 97.0 mol %, further preferably more than 99.0 mol %, with respect to all monomer units.

The content of the VdF unit in the PVdF is preferably 95.0 to 99.999 mol %, more preferably 97.0 mol % or more, further preferably 98.5 mol % or more, more preferably 99.99 mol % or less, further preferably 99.90 mol % or less, with respect to all monomer units.

In the present disclosure, the compositional features of the PVdF can be measured, for example, by $^{19}F$-NMR measurement.

The PVdF may have a polar group. Use of the fluorine-containing copolymer and the PVdF having the polar group as binders enables an electrode mixture layer that is furthermore excellent in flexibility and adhesion to the current collector and a secondary battery that is furthermore excellent in battery characteristics to be formed.

The polar group is not limited, as long as it is a functional group having a polarity. It is preferably at least one selected from the group consisting of a carbonyl group-containing group, an epoxy group, a hydroxy group, a sulfonate group, a sulfate group, a phosphate group, an amino group, an amide group, and an alkoxy group, more preferably at least one selected from the group consisting of a carbonyl group-containing group, an epoxy group, and a hydroxy group, further preferably a carbonyl group-containing group, in view of obtaining furthermore excellent adhesion of the electrode mixture layer to the current collector. The aforementioned hydroxy group does not include the hydroxy group as a part of the aforementioned carbonyl group-containing group. Further, the aforementioned amino group is a monovalent functional group obtained by removing hydrogen from ammonia or primary or secondary amine.

The aforementioned carbonyl group-containing group is a functional group having a carbonyl group (—C(═O)—). The aforementioned carbonyl group-containing group is preferably a carboxylic acid anhydride group or a group represented by Formula: —COOR, wherein R represents a hydrogen atom, an alkyl group, or a hydroxyalkyl group, more preferably a group represented by Formula: —COOR, in view of obtaining furthermore excellent adhesion of the electrode mixture layer to the current collector. The alkyl group and the hydroxyalkyl group preferably have 1 to 16, more preferably 1 to 6, further preferably 1 to 3 carbon atoms. Specifically, examples of the group represented by Formula: —COOR include $—COOCH_2CH_2OH$, $—COOCH_2CH(CH_3)OH$, $—COOCH(CH_3)CH_2OH$, —COOH, —$COOCH_3$, and —$COOC_2H_5$. In the case where the group represented by Formula: —COOR is —COOH or contains —COOH, —COOH may be a carboxylate such as a carboxylate metal salt and ammonium carboxylate.

Further, the carbonyl group-containing group may be a group represented by Formula: —X—COOR, wherein X is an atomic group having the main chain composed of 2 to 15 atoms, the molecular weight of the atomic group is preferably 350 or less, and R represents a hydrogen atom, an alkyl group, or a hydroxyalkyl group. The alkyl group and the hydroxyalkyl group preferably have 1 to 16, more preferably 1 to 6, further preferably 1 to 3 carbon atoms.

The aforementioned amide group is preferably a group represented by Formula: —CO—NRR', wherein R and R' each independently represent a hydrogen atom or a substituted or unsubstituted alkyl group, or a bond represented by Formula: —CO—NR"—, wherein R" represents a hydrogen atom, a substituted or unsubstituted alkyl group, or a substituted or unsubstituted phenyl group.

The aforementioned polar group can be introduced into PVdF either by polymerizing VdF with a monomer having the aforementioned polar group (which will be hereinafter referred to as polar group-containing monomer) or reacting PVdF with a compound having the aforementioned polar group, but it is preferable to polymerize VdF with the aforementioned polar group-containing monomer, in view of productivity.

When VdF is polymerized with the aforementioned polar group-containing monomer, PVdF containing a VdF unit and a polar group-containing monomer unit is obtained. Specifically, the PVdF preferably contains the aforementioned polar group-containing monomer unit, in view of obtaining furthermore excellent adhesion of the electrode mixture layer to the current collector. The content of the polar group-containing monomer unit is preferably 0.001 to 5.0 mol %, more preferably 0.01 to 3.0 mol %, further preferably 0.10 to 1.5 mol %, with respect to all monomer units.

In the present disclosure, the content of the polar group-containing monomer unit in the PVdF can be measured, in the case where the polar group is an acid group such as a carboxylic acid, for example, by acid-base titration of the acid group.

Examples of the aforementioned polar group-containing monomer include hydroxyalkyl (meth)acrylates such as hydroxyethyl acrylate and 2-hydroxypropyl acrylate; unsaturated monobasic acids such as (meth)acrylic acid, crotonic acid, vinyl acetic acid (3-butene acid), 3-pentenoic acid, 4-pentenoic acid, 3-hexene acid, and 4-heptenoic acid; unsaturated dibasic acids such as maleic acid, maleic anhydride, citraconic acid, and citraconic anhydride; alkylidene malonates such as dimethyl methylidene malonate; vinyl carboxyalkyl ethers such as vinyl carboxymethyl ether and vinyl carboxyethyl ether; carboxyalkyl (meth)acrylates such as 2-carboxyethyl acrylate and 2-carboxyethyl methacrylate; (meth) acryloyloxyalkyl dicarboxylic acid esters such as acryloyloxyethyl succinic acid, methacryloyloxyethyl succinic acid, acryloyloxyethyl phthalic acid, acryloyloxypropyl succinic acid, and methacryloyloxyethyl phthalic acid; and unsaturated dibasic acid monoesters such as monomethyl maleate ester, monoethyl maleate ester, citraconic acid monomethyl ester, and citraconic acid monoethyl ester.

In the case of introducing the aforementioned polar group into PVdF by reacting PVdF with a compound having the aforementioned polar group, the compound having the aforementioned polar group to be used can be the aforementioned polar group-containing monomer, or a silane coupling agent or a titanate coupling agent having a group that is reactive with PVdF and a hydrolyzable group. The hydrolyzable group is preferably an alkoxy group. In the case of using a coupling agent, the coupling agent can be added to PVdF by reaction with PVdF that is swelled or dissolved in a solvent.

The PVdF to be used also can be a material obtained by partially dehydrofluorinating PVdF with a base and further reacting the partially dehydrofluorinated PVdF with an oxidant. Examples of the aforementioned oxidant include hydrogen peroxide, hypochlorite, palladium halide, chromium halide, alkali metal permanganate, peracid compound, alkyl peroxide, and alkyl persulfate.

The weight-average molecular weight (in terms of polystyrene) of the PVdF is preferably 50,000 to 3,000,000, more preferably 80,000 or more, further preferably 100,000 or more, particularly preferably 200,000 or more, more preferably 2,400,000 or less, further preferably 2,200,000 or less, particularly preferably 2,000,000 or less, in view of further suppressing the increase in viscosity of the electrode mixture, and forming an electrode mixture layer that is further excellent in adhesion to a current collector and flexibility. The weight-average molecular weight can be measured by gel permeation chromatography (GPC) using dimethylformamide as a solvent. The weight-average molecular weight of the PVdF may be 1,000,000 or more or 1,500,000 or more, in view of further suppressing the increase in viscosity of the electrode mixture, and forming an electrode mixture layer that is further excellent in adhesion to a current collector and flexibility.

The number-average molecular weight (in terms of polystyrene) of the PVdF is preferably 20,000 to 1,500,000, more preferably 40,000 or more, further preferably 70,000 or more, particularly preferably 140,000 or more, more preferably 1,400,000 or less, further preferably 1,200,000 or less, particularly preferably 1,100,000 or less, in view of further suppressing the increase in viscosity of the electrode mixture, and forming an electrode mixture layer that is further excellent in adhesion to a current collector and flexibility. The number-average molecular weight can be measured by gel permeation chromatography (GPC) using dimethylformamide as a solvent.

The PVdF has a melting point of preferably 100 to 240° C. The melting point can be determined using a differential scanning calorimetry (DSC) device and is a temperature corresponding to the maximum value in the heat-of-fusion curve when the temperature is raised at a rate of 10° C./minute.

The PVdF can be produced, for example, by a conventionally known method including appropriately mixing VdF, the aforementioned polar group-containing monomer, and an additive such as a polymerization initiator, and performing solution polymerization or suspension polymerization.

The PVdF has a storage modulus at 30° C. of preferably 2,000 MPa or less, more preferably 1,800 MPa or less.

The PVdF has a storage modulus at 60° C. of preferably 1,500 MPa or less, more preferably 1,300 MPa or less.

The PVdF has a storage modulus at 30° C. of preferably 1,000 MPa or more, more preferably 1,100 MPa or more.

The PVdF has a storage modulus at 60° C. of preferably 600 MPa or more, more preferably 700 MPa or more.

The storage modulus of the PVdF can be measured by the same method as for the storage modulus of the fluorine-containing copolymer.

The mass ratio of the PVdF to the fluorine-containing copolymer (PVdF/fluorine-containing copolymer) in the binder is preferably 99/1 to 1/99, more preferably 97/3 to 10/90, further preferably 95/5 to 40/60, most preferably 90/10 to 50/50, in view of further suppressing the increase in viscosity of the electrode mixture, and forming an electrode mixture layer that is further excellent in adhesion to a current collector and flexibility.

The binder may contain a polymer other than the PVdF or the fluorine-containing copolymer. Examples of the other polymer include polymethacrylate, polymethylmethacrylate, polyimide, polyamide imide, polycarbonate, styrene rubber, and butadiene rubber.

The content of the fluorine-containing copolymer in the binder is preferably 1 mass % or more, more preferably 3 mass % or more, further preferably 5 mass % or more, particularly preferably 10 mass % or more, most preferably 15 mass % or more, and may be 100 mass % or less, with respect to the mass of the binder, in view of further suppressing the increase in viscosity of the electrode mixture, and forming an electrode mixture layer that is further excellent in adhesion to a current collector and flexibility.

The content of the binder in the electrode mixture is preferably 0.1 to 1.6 parts by mass, more preferably 0.3 to 1.6 parts by mass, further preferably 0.5 to 1.6 parts by mass, particularly preferably 0.8 to 1.5 parts by mass, most preferably 1.0 to 1.5 parts by mass, and may be 1.0 part by mass or less, with respect to 100 parts by mass of the electrode active material, in view of further suppressing the increase in viscosity of the electrode mixture, and forming an electrode mixture layer that is further excellent in adhesion to a current collector and flexibility.

(Additive)

The electrode mixture of the present disclosure comprises, as an additive, a polymer material comprising the following repeating unit:

$$—[CH_2—CHR]—$$

wherein R represents a chain or cyclic amide group, a nitrile group, or a substituted alkyl group formed by substituting at least one of the hydrogen atoms of an alkyl group having 1 to 4 carbon atoms with a chain or cyclic amide group or a nitrile group. The electrode mixture of the present disclosure can form an electrode mixture layer that has excellent flexibility and sufficiently adheres well to the current collector since it comprises the additive. The electrode mixture can also easily form an electrode mixture layer since it has a viscosity unlikely to increase and its excellent coatability.

The additive is preferably at least one selected from the group consisting of a polyvinylpyrrolidone and a polyacrylonitrile, more preferably a polyvinylpyrrolidone, in view of further suppressing the increase in viscosity of the electrode mixture, and forming an electrode mixture layer that is further excellent in adhesion to a current collector and flexibility.

The number-average molecular weight of the additive is preferably 10,000 to 500,000, more preferably 20,000 or more, further preferably 30,000 or more, more preferably 400,000 or less, further preferably 300,000 or less, in view of further suppressing the increase in viscosity of the electrode mixture, and forming an electrode mixture layer that is further excellent in adhesion to a current collector and flexibility. In the present disclosure, the number-average molecular weight of the additive can be measured by gel permeation chromatography (GPC).

The polyvinylpyrrolidone is not specifically limited, as long as it is a polymer of N-vinyl-2-pyrrolidone. The polyvinylpyrrolidone may be a polymer consisting only of N-vinyl-2-pyrrolidone or a copolymer of N-vinyl-2-pyrrolidone and other monomers, but is preferably a polymer consisting only of N-vinyl-2-pyrrolidone or a copolymer of N-vinyl-2-pyrrolidone and non-fluorinated monomer, more preferably a polymer consisting only of N-vinyl-2-pyrrolidone.

The number-average molecular weight of polyvinylpyrrolidone is preferably 10,000 to 500,000, more preferably 20,000 or more, further preferably 30,000 or more, more preferably 400,000 or less, further preferably 300,000 or less.

The polyacrylonitrile is not limited, as long as it is a polymer of acrylonitrile. The polyacrylonitrile may be a polymer consisting only of acrylonitrile or a copolymer of acrylonitrile and other monomers but is preferably a polymer consisting only of N-vinyl-2-pyrrolidone or a copolymer of N-vinyl-2-pyrrolidone and a non-fluorinated monomer, more preferably a polymer consisting only of N-vinyl-2-pyrrolidone. Examples of the non-fluorinated monomer include (meth)acrylic acid.

The number-average molecular weight of polyacrylonitrile is preferably 100,000 to 350,000, more preferably 130,000 or more, more preferably 250,000 or less, further preferably 220,000 or less.

The content of the additive in the electrode mixture is preferably 0.001 to 0.2 parts by mass, more preferably 0.01 parts by mass or more, further preferably 0.02 parts by mass or more, more preferably 0.15 parts by mass or less, further preferably 0.11 parts by mass or less, with respect to 100 parts by mass of the electrode active material, in view of further suppressing the increase in viscosity of the electrode mixture, and forming an electrode mixture layer that is further excellent in adhesion to a current collector and flexibility.

In the electrode mixture of the present disclosure, the mass ratio of the fluorine-containing copolymer (which will be referred to as "fluorine-containing copolymer (a)") to the additive (which will be referred to as "additive (b)") (fluorine-containing copolymer (a)/additive (b)) is preferably 1/99 to 99/1, more preferably 20/80 or more, further preferably 40/60 or more, particularly preferably 60/40 or more, more preferably 98/2 or less, further preferably 90/10 or less.

The content of the electrode active material, the binder and the additive in the electrode mixture of the present disclosure is selected in consideration of the coating properties to the current collector, formation of a thin film after drying, and the like. The total content of the electrode active material, the binder, and the additive in the electrode mixture is preferably 50 to 90 mass %, more preferably 60 to 85 mass %, further preferably 70 to 80 mass %. The electrode mixture of the present disclosure has a viscosity unlikely to increase even when it contains the electrode active material, the binder, and the additive at high concentrations.

The electrode mixture of the present disclosure can be prepared by mixing the electrode active material, the organic solvent, the binder, the additive, and other components, as required. At this time, the order in which each component is mixed is not limited. For example, after mixing the binder, the additive, and the organic solvent, the electrode active material and other components may be mixed. Alternatively, a composite material of the binder and the electrode active material may be obtained, for example, by a method including spraying a solution or a dispersion of the binder to the electrode active material and drying the resultant, and then the composite material obtained, the organic solvent, the additive, and other components may be mixed.

The binder to be used desirably has a small-particle diameter, specifically an average particle diameter of 1,000

μm or less, particularly 50 to 350 μm, for enabling rapid dissolution in the aforementioned organic solvent.

<Composition>

The present disclosure also relates to a composition comprising: a fluorine-containing copolymer comprising a vinylidene fluoride unit and a tetrafluoroethylene unit; and a polymer material, as an additive, comprising the following repeating unit:

$$—[CH_2—CHR]—$$

wherein R represents a chain or cyclic amide group, a nitrile group, or a substituted alkyl group formed by substituting at least one of the hydrogen atoms of an alkyl group having 1 to 4 carbon atoms with a chain or cyclic amide group or a nitrile group.

When the composition of the present disclosure, which has the aforementioned configuration, is used as a material for forming an electrode mixture, an electrode mixture having a viscosity unlikely to increase can be easily produced, capable of forming an electrode mixture layer that is excellent in adhesion to a current collector and flexibility can be formed, and capable of forming a secondary battery having sufficient load characteristics can be easily produced.

The fluorine-containing copolymer contained in the composition of the present disclosure can have the same configuration as that of the fluorine-containing copolymer contained in the electrode mixture of the present disclosure except for containing a VdF unit and a TFE unit as essential monomer units. Further, the additive contained in the composition of the present disclosure can have the same configuration as that of the additive contained in the electrode mixture of the present disclosure.

In the composition of the present disclosure, the mass ratio of the fluorine-containing copolymer (which will be referred to as "fluorine-containing copolymer (a)") to the additive (which will be referred to as "additive (b)") (fluorine-containing copolymer (a)/additive (b)) is preferably 1/99 to 99/1, more preferably 20/80 or more, further preferably 40/60 or more, particularly preferably 60/40 or more, more preferably 98/2 or less, further preferably 90/10 or less.

The composition of the present disclosure preferably further comprises polyvinylidene fluoride (PVdF). The PVdF contained in the composition of the present disclosure can have the same configuration as that of the PVdF contained in the electrode mixture of the present disclosure.

The mass ratio of the PVdF to the fluorine-containing copolymer (PVdF/fluorine-containing copolymer) in the composition of the present disclosure is preferably 99/1 to 1/99, more preferably 97/3 to 10/90, further preferably 95/5 to 40/60, most preferably 90/10 to 50/50, in view of easily forming an electrode mixture having a viscosity further unlikely to increase, and also easily forming an electrode mixture capable of forming an electrode mixture layer that is further excellent in adhesion to a current collector and flexibility, when used as a material for forming an electrode mixture.

The composition of the present disclosure preferably further contains an organic solvent. The organic solvent contained in the composition of the present disclosure can have the same configuration as that of the organic solvent contained in the electrode mixture of the present disclosure.

The content of the fluorine-containing copolymer and the additive in the composition of the present disclosure is preferably 0.5 to 50 mass %, more preferably 1.0 to 30 mass %, in view of easily mixing with the electrode active material to reliably achieve good homogeneity, when used for preparing the electrode mixture. Further, the content of the fluorine-containing copolymer, the PVdF, and the additive in the composition of the present disclosure is preferably 0.5 to 50 mass %, more preferably 1.0 to 30 mass %, in view of easily mixing with the electrode active material to reliably achieve good homogeneity.

The composition of the present disclosure can be suitably used as a material for producing an electrode mixture. The present disclosure also relates to an electrode mixture to be obtained using the aforementioned composition.

The composition of the present disclosure may be a composition for secondary batteries. In the present disclosure, the composition for secondary batteries includes compositions used for positive electrodes, negative electrodes, and separators of secondary batteries.

The electrode mixture and the composition of the present disclosure can be suitably used as materials for forming secondary batteries. The electrode mixture and the composition of the present disclosure each have a viscosity unlikely to increase, and are capable of forming an electrode mixture layer that is excellent in adhesion to a current collector and flexibility, whereby a secondary battery having sufficient load characteristics can be produced, and accordingly, the electrode mixture and the composition of the present disclosure are suitable as an electrode mixture and a composition used for electrodes of secondary batteries. Such a secondary battery to which the electrode mixture and the composition of the present disclosure are applied comprises a positive electrode in which a positive electrode mixture is held by a positive electrode current collector, a negative electrode in which a negative electrode mixture is held by a negative electrode current collector, and an electrolytic solution.

The electrode mixture of the present disclosure may be an electrode mixture for secondary batteries or an electrode mixture for lithium ion secondary batteries. The electrode mixture of the present disclosure may be a positive electrode mixture to be used for producing a positive electrode or a negative electrode mixture to be used for producing a negative electrode, and is preferably a positive electrode mixture. The electrode mixture layer formed from the electrode mixture of the present disclosure may be a positive electrode mixture layer or a negative electrode mixture layer.

<Electrode>

The electrode of the present disclosure comprises a current collector and an electrode mixture layer. The electrode mixture layer is formed using the electrode mixture of the present disclosure and may be provided on one side of the current collector or each of both sides thereof.

Since the electrode of the present disclosure comprises an electrode mixture layer formed by using the electrode mixture of the present disclosure, the electrode of the present disclosure has excellent flexibility and sufficiently close contact between the current collector and the electrode mixture layer, and is capable of forming a secondary battery that is excellent in battery characteristics.

The density of the electrode mixture layer is preferably 2.0 to 5.0 g/$cm^3$, more preferably 2.5 to 5.0 g/$cm^3$.

The density of the electrode mixture layer can be calculated from the mass and the volume of the electrode mixture layer.

The thickness of the electrode mixture layer is preferably 20 μm or more, more preferably 45 μm or more, further preferably 55 μm or more, particularly preferably 60 μm or more, preferably 170 μm or less, more preferably 150 μm or less, in view of obtaining still outstanding battery characteristics. Further, the thickness of the electrode mixture layer may be 85 μm or less or may be less than 69 μm.

The thickness of the electrode mixture layer can be measured by a micrometer. In the case where the electrode mixture layer is provided on each of both sides of the current collector, the thickness of the electrode mixture layer in the present disclosure is a thickness per side.

Examples of the current collector of the electrode of the present disclosure include metal foils or metal meshes of iron, stainless steel, copper, aluminum, nickel, titanium, and the like. Among these, an aluminum foil is preferable.

The electrode of the present disclosure can be suitably produced by a production method including applying the electrode mixture of the present disclosure to the current collector. After applying the electrode mixture, the coating film may be dried, and the dry coating film obtained may be pressed.

The amount of the electrode mixture to be applied to the current collector is preferably 15 $mg/cm^2$ or more, more preferably 17.5 $mg/cm^2$ or more, preferably 60 $mg/cm^2$ or less, more preferably 50 $mg/cm^2$ or less. The amount of the electrode mixture to be applied is a dry weight of the electrode mixture per unit area.

<Secondary Battery>

The present disclosure also provides a secondary battery comprising the aforementioned electrode.

The secondary battery of the present disclosure exhibits sufficient load characteristics and has excellent battery characteristics since the secondary battery comprises an electrode formed by using the electrode mixture of the present disclosure.

The secondary battery of the present disclosure preferably comprises a positive electrode, a negative electrode, and a non-aqueous electrolyte, wherein one or each of the positive electrode and the negative electrode is the aforementioned electrode. Further, the secondary battery of the present disclosure preferably comprises a positive electrode, a negative electrode, and a non-aqueous electrolyte, wherein the positive electrode is the aforementioned electrode.

The non-aqueous electrolyte is not limited, and one or more of known solvents such as propylene carbonate, ethylene carbonate, butylene carbonate, γ-butyl lactone, 1,2-dimethoxyethane, 1,2-diethoxyethane, dimethyl carbonate, diethyl carbonate, and ethyl methyl carbonate can be used. The electrolyte to be used can be any one of conventionally known electrolytes and can be $LiClO_4$, $LiAsF_6$, $LiPF_6$, $LiBF_4$, LiCl, LiBr, $CH_3SO_3Li$, $CF_3SO_3Li$, cesium carbonate, or the like.

Since the electrode of the present disclosure has excellent flexibility and a sufficiently close contact between the current collector and the electrode mixture layer, and is capable of forming a secondary battery that is excellent in battery characteristics, the electrode can be suitably used as an electrode for wound-type secondary batteries. Further, the secondary battery of the present disclosure may be a wound-type secondary battery.

The electrode of the present disclosure is useful for non-aqueous electrolyte secondary batteries, specifically, not only for a lithium ion secondary battery including a liquid electrolyte as described above, but also for a lithium secondary battery including a polymer electrolyte. Further, it is useful also for electric double layer capacitors.

Although the embodiments have been described above, it will be understood that various changes in form and details can be made without departing from the spirit and scope of the claims.

The present disclosure provides an electrode mixture comprising: an electrode active material; an organic solvent; a binder; and an additive, wherein the binder comprises a fluorine-containing copolymer comprising a vinylidene fluoride unit and a fluorinated monomer unit, provided that the vinylidene fluoride unit is excluded from the fluorinated monomer unit; the additive is a polymer material containing the following repeating unit:

$$—[CH_2—CHR]—$$

wherein R represents a chain or cyclic amide group, a nitrile group, or a substituted alkyl group formed by substituting at least one of hydrogen atoms of an alkyl group having 1 to 4 carbon atoms with a chain or cyclic amide group or a nitrile group; a content of the binder is 0.1 to 1.6 parts by mass with respect to 100 parts by mass of the electrode active material; and a content of the additive is 0.001 to 0.2 parts by mass with respect to 100 parts by mass of the electrode active material.

In the electrode mixture of the present disclosure, the fluorinated monomer unit of the fluorine-containing copolymer is preferably at least one selected from the group consisting of a tetrafluoroethylene unit, a chlorotrifluoroethylene unit, a fluoroalkyl vinyl ether unit, and a hexafluoropropylene unit.

In the electrode mixture of the present disclosure, a content of the vinylidene fluoride unit in the fluorine-containing copolymer is preferably 50.0 to 99.0 mol % with respect to all monomer units.

In the electrode mixture of the present disclosure, the additive is preferably at least one selected from the group consisting of a polyvinylpyrrolidone and a polyacrylonitrile, more preferably a polyvinylpyrrolidone. In the electrode mixture of the present disclosure, the number-average molecular weight of the additive is preferably 10,000 to 500,000.

In the electrode mixture of the present disclosure, the electrode active material is preferably at least one selected from the group consisting of lithium-containing transition metal composite oxides and lithium-containing transition metal phosphate compounds.

Further, the present disclosure provides an electrode comprising a current collector, and an electrode mixture layer provided on one or each of both sides of the current collector and formed by the electrode mixture.

Further, the present disclosure provides a secondary battery comprising the electrode.

Further, the present disclosure provides a composition comprising a fluorine-containing copolymer comprising a vinylidene fluoride unit and a tetrafluoroethylene unit, and a polymer material, as an additive, comprising the following repeating unit:

$$—[CH_2—CHR]—$$

wherein R represents a chain or cyclic amide group, a nitrile group, or a substituted alkyl group formed by substituting at least one of hydrogen atoms of an alkyl group having 1 to 4 carbon atoms with a chain or cyclic amide group or a nitrile group.

In the composition of the present disclosure, a content of the vinylidene fluoride unit in the fluorine-containing copolymer is preferably 50.0 to 99.0 mol % with respect to all monomer units.

In the composition of the present disclosure, a mass ratio of the fluorine-containing copolymer (a) to the additive (b), a/b, is preferably 1/99 to 99/1.

The composition of the present disclosure preferably further comprises an organic solvent.

EXAMPLES

Next, the embodiments of the present disclosure will be described with reference to experimental examples and production examples, but the present disclosure is not limited to the experimental examples and production examples.

Polymerization Example 1

1,340 g of pure water, 0.75 g of methylcellulose, 1,280 g of perfluorocyclobutane (C318), and 218 g of a mixed gas with a molar ratio of VdF/TFE of 94.3/5.7 (mol %) were put into an autoclave with an internal volume of 4 liters, and the temperature was adjusted to 37° C. Thereafter, 0.699 g of di-secondary butyl peroxydicarbonate, 6 g of methanol, and 0.88 g of ethyl acetate were added thereto, and 384 g of a mixed gas with a molar ratio of VdF/TFE of 85/15 (mol %) was added so that the tank pressure was kept constant at 1.4 MPaG. The pressure inside the tank was released 11 hours after the start of the reaction, to obtain a fluorine-containing copolymer (A-1).

Polymerization Example 2

0.6 kg of pure water and 0.6 g of methylcellulose were put into an autoclave with an internal volume of 2 L, followed by sufficient purging with nitrogen. 0.57 kg of 1,1,1,3,3-pentafluorobutane was put therein, and the system was kept at 37° C. A mixed gas with a molar ratio of TFE/VdF of 7/93 was put therein, and the pressure inside the tank was set to 1.5 MPa. 0.17 g of 4-pentenoic acid and 0.5 g of a 50 mass % methanol solution of di-n-propyl peroxydicarbonate were added to initiate polymerization. A mixed gas with a molar ratio of TFE/VdF of 15/85 was supplied so as to maintain the pressure inside the tank, and 70 g of the mixed gas was added by the end of the reaction. 4-pentenoic acid was continuously added according to the supply of the mixed gas, and the amount added by the end of the reaction was 0.43 g. After the completion of addition of 70 g of the mixed gas, the gas in the tank was released, to terminate the reaction. The reaction product was washed with water and dried, to obtain a fluorine-containing copolymer (A-2).

The physical properties of the fluorine-containing copolymers and PVdFs ((A-1) to (A-6)) and the additives ((B-1) to (B-4)) used in the experimental examples and comparative examples are shown.

Fluorine-Containing Copolymer (A-1)
- VdF/TFE=83.3/16.7 (mol %)
- Solution viscosity: 847 mPa·s
- Weight-average molecular weight: 1,160,000

Fluorine-Containing Copolymer (A-2)
- VdF/TFE/4-pentenoic acid=81.63/17.92/0.45 (mol %)
- Solution viscosity: 393 mPa·s
- Weight-average molecular weight: 8,200,000

PVdF (A-3)
- VdF=100 (mol %)
- Solution viscosity: 2400 mPa·s
- Weight-average molecular weight: 1,800,000

Fluorine-Containing Copolymer (A-4)
- VdF/HFP=95.0/5.0 (mol %)
- Solution viscosity: 269 mPa·s
- Weight-average molecular weight: 730,000

Fluorine-Containing Copolymer (A-5)
- VdF/CTFE=98/2 (mol %)
- Solution viscosity: 433 mPa·s
- Weight-average molecular weight: 850,000

PVdF (A-6)
- VdF/acrylic acid=99/1(mol %)
- Solution viscosity: 800 mPa·s
- Weight-average molecular weight: 1,100,000

Additive (B-1)
- Polyvinylpyrrolidone (K30) (available from Tokyo Chemical Industry Co., Ltd.)
- Number-average molecular weight: 40,000

Additive (B-2)
- Polyvinylpyrrolidone (K90) (available from Tokyo Chemical Industry Co., Ltd.)
- Number-average molecular weight: 360,000

Additive (B-3)
- Polyacrylonitrile (available from Sigma-Aldrich Co. LLC.)
- Number-average molecular weight: 150,000

Additive (B-4)
- Polyvinyl alcohol (available from Denka Company Limited)
- Polymerization degree: 2,000
- Saponification degree: 98.5 to 99.4%

Experimental Example 1

A positive electrode mixture (slurry) was produced by the following method. 100 parts by mass of a positive electrode active material (NMC811 ($LiNi_{0.8}Mn_{0.1}Co_{0.1}O_2$)), 1.54 parts by mass of acetylene black (AB) as a conductive additive, 0.23 parts by mass of the fluorine-containing copolymer (A-1), 0.90 parts by mass of the PVdF (A-3), and 0.05 parts by mass of the additive (B-1) were weighed. They were dissolved in N-methyl-2-pyrrolidone (NMP) so that the total concentration of the fluorine-containing copolymer (A-1), the PVdF (A-3), and the additive (B-1) was 6 mass %, and then a predetermined amount of the positive electrode active material and the conductive additive were added to this solution. The resultant was sufficiently mixed with a stirrer, to ensure good homogeneity. The total solid concentration of the positive electrode active material, the conductive additive, the fluorine-containing copolymer, the PVdF, and the additive was adjusted to 80 mass % with respect to the total mass of the slurry.

Experimental Example 2

A positive electrode mixture was produced in the same manner as in Experimental Example 1 except that NMC622 ($LiNi_{0.6}Mn_{0.2}Co_{0.2}O_2$) was used as a positive electrode active material.

Experimental Example 3

A positive electrode mixture was produced in the same manner as in Experimental Example 1 except that LCO ($LiCoO_2$) was used as a positive electrode active material, and the total solid concentration of the positive electrode active material, the conductive additive, the fluorine-containing copolymer, the PVdF, and the additive was adjusted to 79 mass % with respect to the total mass of the slurry.

Experimental Example 4

A positive electrode mixture (slurry) was produced by the following method. 100 parts by mass of a positive electrode active material (LFP ($LiFePO_4$)), 20.41 parts by mass of a NMP dispersion of 5 mass % carbon nanotube (CNT), 0.20 parts by mass of the fluorine-containing copolymer (A-1), 0.82 parts by mass of the PVdF (A-3), and 0.10 parts by mass of the additive (B-1) were weighed. They were dissolved in N-methyl-2-pyrrolidone (NMP) so that the total concentration of the fluorine-containing copolymer (A-1), the PVdF (A-3), and the additive (B-1) was 5.5 mass %, and then a predetermined amount of the positive electrode active material and the CNT dispersion were added to this solution. The resultant was sufficiently mixed with a stirrer, to ensure good homogeneity. The total solid concentration of the positive electrode active material, the conductive additive, the fluorine-containing copolymer, the PVdF, and the additive was adjusted to 65 mass % with respect to the total mass of the slurry.

Experimental Example 5

A positive electrode mixture was produced in the same manner as in Experimental Example 1 except that the additive (B-2) was used as an additive, and the total solid concentration of the positive electrode active material, the conductive additive, the fluorine-containing copolymer, the PVdF, and the additive was adjusted to 78 mass % with respect to the total mass of the slurry.

Experimental Example 6

A positive electrode mixture was produced in the same manner as in Experimental Example 1 except that 0.23 parts by mass of the fluorine-containing copolymer (A-4) as a fluorine-containing copolymer and 0.90 parts by mass of the PVdF (A-3) as a PVdF were used.

Experimental Example 7

A positive electrode mixture was produced in the same manner as in Experimental Example 1 except that LCO ($LiCoO_2$) was used as a positive electrode active material, and 0.23 parts by mass of the fluorine-containing copolymer (A-1) as a fluorine-containing copolymer and 0.90 parts by mass of the PVdF (A-6) as a PVdF were used.

Experimental Example 8

A positive electrode mixture was produced in the same manner as in Experimental Example 1 except that LCO ($LiCoO_2$) was used as a positive electrode active material, and 0.23 parts by mass of the fluorine-containing copolymer (A-2) as a fluorine-containing copolymer and 0.90 parts by mass of the PVdF (A-3) as a PVdF were used.

Experimental Example 9

A positive electrode mixture was produced in the same manner as in Experimental Example 1 except that 0.05 parts by mass of the additive (B-3) was used as an additive.

Experimental Example 10

A positive electrode mixture was produced in the same manner as in Experimental Example 1 except that 1.13 parts by mass of the fluorine-containing copolymer (A-5) was used as a fluorine-containing copolymer, and no PVdF was used.

Experimental Example 11

A positive electrode mixture was produced in the same manner as in Experimental Example 9 except that NMC622 ($LiNi_{0.6}Mn_{0.2}Co_{0.2}O_2$) was used as a positive electrode active material.

Comparative Example 1

A positive electrode mixture was produced in the same manner as in Experimental Example 1 except that no fluorine-containing copolymer was used, 1.13 parts by mass of the PVdF (A-3) was used as a PVdF, and the total solid concentration of the positive electrode active material, the conductive additive, the PVdF, and the additive was adjusted to 78 mass % with respect to the total mass of the slurry.

Comparative Example 2

A positive electrode mixture was produced in the same manner as in Experimental Example 1 except that no additive was used, and the total solid concentration of the positive electrode active material, the conductive additive, the fluorine-containing copolymer, and the PVdF was adjusted to 76 mass % with respect to the total mass of the slurry.

Comparative Example 3

A positive electrode mixture was produced in the same manner as in Experimental Example 4 except that no additive was used.

Comparative Example 4

A positive electrode mixture was produced in the same manner as in Experimental Example 1 except that 0.05 parts by mass of the additive (B-4) was used as an additive, and the total solid concentration of the positive electrode active material, the conductive additive, the fluorine-containing copolymer, the PVdF, and the additive was adjusted to 76 mass % with respect to the total mass of the slurry.

Comparative Example 5

A positive electrode mixture was produced in the same manner as in Comparative Example 1 except that NMC622 ($LiNi_{0.6}Mn_{0.2}Co_{0.2}O_2$) was used as a positive electrode active material.

Comparative Example 6

A positive electrode mixture was produced in the same manner as in Comparative Example 2 except that NMC622 ($LiNi_{0.6}Mn_{0.2}Co_{0.2}O_2$) was used as a positive electrode active material.

(Production of Positive Electrode)

The positive electrode mixture produced in any of Experimental Examples 1 to 11 and Comparative Examples 1 to 6 was uniformly applied to one side of the positive electrode current collector (aluminum foil with a thickness of 20 μm), so that the amount applied was 22.5 mg/cm$^2$, and NMP was completely volatilized. Then, the resultant was pressed by applying a pressure of 10 t using a roll press machine to produce a positive electrode composed of a positive electrode mixture layer and a positive electrode current collector. The density of the positive electrode mixture layer was 2.75 g/cc.

(Production of Negative Electrode)

Artificial graphite powder as a negative electrode active material, an aqueous dispersion of sodium carboxymethyl cellulose (concentration of sodium carboxymethyl cellulose: 1 mass %) as a thickener, and an aqueous dispersion of styrene-butadiene rubber (concentration of styrene-butadiene rubber: 50 mass %) as a binder were used and mixed in a water solvent so that the solid content ratio of the active material, the thickener, and the binder was 97.6/1.2/1.2 (mass % ratio) into a slurry, to prepare a negative electrode mixture slurry. It was uniformly applied to a copper foil with a thickness of 20 μm, dried, and then compression-formed with a press machine, to obtain a negative electrode.

(Preparation of Electrolytic Solution)

$LiPF_6$ dissolved in a mixed solvent of ethylene carbonate (EC) and ethyl methyl carbonate (EMC) (EC:EMC=30:70 (v/v)) at a concentration of 1 mol/L and supplemented with 1 mass % vinylene carbonate (VC) was used. Here, $LiPF_6$, EC, EMC, and VC were battery grade products, available from KISHIDA CHEMICAL Co., Ltd.

Production Example 1

The positive electrode mixture produced in Experimental Example 2 was uniformly applied to one side of the positive electrode current collector (aluminum foil with a thickness of 20 μm) so that the amount applied was 20.0 mg/cm$^2$, and NMP was completely volatilized. Then, the resultant was pressed using a roll press machine to produce a positive electrode.

The positive electrode produced, a negative electrode produced as above, and a polyethylene separator were stacked in the order of the negative electrode, the separator, and the positive electrode, to produce a battery element.

This battery element was inserted into a bag made of a laminate film composed of an aluminum sheet (with a thickness of 40 μm) and resin layers coating both sides thereof, with the terminals of the positive electrode and the negative electrode protruding, and the aforementioned electrolytic solution was poured into the bag. The resulting bag was vacuum-sealed, to thereby produce a lithium ion secondary battery in the form of a sheet.

Production Example 2

A lithium ion secondary battery was produced in the same manner as in Production Example 1 except that the positive electrode mixture produced in Experimental Example 11 was used.

Production Example 3

A lithium ion secondary battery was produced in the same manner as in Production Example 1 except that the positive electrode mixture produced in Comparative Example 5 was used.

Production Example 4

A lithium ion secondary battery was produced in the same manner as in Production Example 1 except that the positive electrode mixture produced in Comparative Example 6 was used.

The viscosity change of the positive electrode mixture obtained in each of Experimental Examples 1 to 10 and Comparative Examples 1 to 4, the peel strength between the positive electrode mixture layer and the positive electrode current collector and the flexibility of the positive electrode were measured. Further, the load characteristic of the lithium ion secondary battery obtained in each of Production Examples 1 to 4 was measured.

The measurement methods were as follows.

(Compositional Features of Polymer)

The content of each of TFE unit, HFP unit, and CTFE unit in the fluorine-containing copolymer and the PVdF was determined by a method such as $^{19}$F-NMR measurement using an NMR spectrometer (VNS 400 MHz, available from Agilent Technologies, Inc.).

(Content of 4-Pentenoic Acid)

The content of 4-pentenoic acid unit in the fluorine-containing copolymer was measured by esterifying the carboxyl group of 4-pentenoic acid unit to convert it to an ester group and analyzing the esterified fluorine-containing copolymer by $^1$H-NMR. Specifically, 400 mg of the fluorine-containing copolymer, 10 mg of trimethylsilyldiazomethane, and 3 mg of methanol were reacted at 25° C. for 12 hours, and the polymer obtained was washed with methanol, followed by vacuum drying at 70° C. for 24 hours. Thereafter, the dried polymer was analyzed by $^1$H-NMR, to determine the content from the spectrum at 3.7 ppm in $^1$H-NMR.

(Content of Acrylic Acid)

The content of the acrylic acid unit in the PVdF was measured by acid-base titration of the carboxyl group. Specifically, about 0.5 g of the PVdF was dissolved in acetone at a temperature of 70 to 80° C. 5 ml of water was added dropwise under vigorous stirring so as to avoid solidification of the PVdF. In the neutral transition at about −270 mV, titration with an aqueous NaOH solution having a concentration of 0.1 N was performed until complete neutralization of acidity. From the measurement results, the amount of substance of acrylic acid unit contained in 1 g of the PVdF was determined, and the content of acrylic acid unit was calculated therefrom.

(Solution Viscosity)

An fluorine-containing copolymer or PVdF solution (5 mass %) in NMP was prepared. Using a B-type viscometer (TV-10M, available from TOKI SANGYO CO., LTD.), the viscosity of the solution in NMP 10 minutes after the start of measurement was measured under the conditions of 25° C., rotor No. M4, and a rotational speed of 6 rpm.

(Weight-Average Molecular Weight)

The weight-average molecular weight was measured by gel permeation chromatography (GPC). The weight-average molecular weight was calculated based on the data (reference: polystyrene) measured under circulating dimethylformamide (DMF) as a solvent at a flow rate of 1.0 ml/minute, using AS-8010, CO-8020, columns (three columns, GMHHR-H, connected in series), available from Tosoh Corporation, and RID-10A, available from SHIMADZU CORPORATION.

(Viscosity Change of Positive Electrode Mixture)

Using a B-type viscometer (TV-10M, available from TOKI SANGYO CO., LTD.), the viscosity of the positive electrode mixture 10 minutes after the start of measurement was measured under the conditions of 25° C., rotor No. M4, and a rotational speed of 6 rpm. The viscosity change (Xn) was determined by the following formula from the viscosity (η0) of the positive electrode mixture measured immediately after preparation of the positive electrode mixture and the viscosity (ηn) 5 days after preparation of the mixture.

$$Xn=\eta n/\eta 0\times 100[\%]$$

(Density of Positive Electrode Mixture Layer)

The area, the film thickness, and the weight of the positive electrode mixture layer were measured, to calculate the density of the positive electrode mixture layer from these values.

(Peel Strength Between Positive Electrode Mixture Layer and Positive Electrode Current Collector of Positive Electrode)

A test specimen of 1.2 cm×7.0 cm was produced by cutting a positive electrode. After the positive electrode mixture layer side of the test specimen was fixed to a movable jig with a double-sided adhesive tape, a tape was attached to a surface of the positive electrode current collector, and the stress (N/cm) when the tape was drawn at 90 degrees at a rate of 100 mm/minute was measured using an autograph. The load cell of the autograph used was 50 N.

(Flexibility of Positive Electrode)

A test piece of 2 cm×10 cm was produced by cutting a positive electrode obtained by pressing with a roll press machine, and the test piece was wound around a round bar with a diameter of 3.5 mm, 3 mm, or 2.5 mm. The resulting positive electrode mixture layer was visually observed and evaluated according to the following criteria.

Good: No cracks were observed.

Acceptable: Some cracks were observed, but no breakage of the positive electrode mixture layer or the positive electrode current collector was observed.

Poor: The positive electrode mixture layer and the positive electrode current collector were broken.

* According to JIS-K5600-5-1 flexibility (cylindrical mandrel method)

(Measurement of 2 C/0.2 C Load Characteristic)

The lithium ion secondary battery produced as above interposed and pressurized between plates was subjected to constant current-constant voltage charging (which will be hereinafter referred to as CC/CV charging) at a current equivalent to 1 C to 4.2 V (0.1 C cut) and then constant current discharging at a current equivalent to 0.2 C to 3 V. This was regarded as a 0.2 C discharge capacity. Here, 1 C represents a current value at which the standard capacity of the battery is discharged in 1 hour, and 0.2 C represents a current value that is five times smaller than that value, for example. The CC/CV charging was performed again under the same conditions as above, followed by constant current discharging at a current equivalent to 2 C to 3 V. This was regarded as a 2 C discharge capacity. The proportion of the 2 C discharge capacity to the 0.2 C discharge capacity was determined, and this was regarded as a 2 C/0.2 C load characteristic (%).

(2 C discharge capacity)÷(0.2 C discharge capacity)×100=2 C/0.2 C load characteristic (%)

Table 1 and Table 2 show the evaluation results.

TABLE 1

| | | Experimental Example 1 | Experimental Example 2 | Experimental Example 3 | Experimental Example 4 | Experimental Example 5 | Experimental Example 6 | Experimental Example 7 |
|---|---|---|---|---|---|---|---|---|
| Compositional features of positive electrode mixture (parts by mass) | | | | | | | | |
| Positive electrode active material | NMC811 | 100 | | | | 100 | 100 | |
| | NMC622 | | 100 | | | | | |
| | LCO | | | 100 | | | | 100 |
| | LFP | | | | 100 | | | |
| Fluorine-containing copolymer of PVdF | (A-1) | 0.23 | 0.23 | 0.23 | 0.20 | 0.23 | | 0.23 |
| | (A-2) | | | | | | | |
| | (A-3) | 0.90 | 0.90 | 0.90 | 0.82 | 0.90 | 0.90 | |
| | (A-4) | | | | | | 0.23 | |
| | (A-5) | | | | | | | |
| | (A-6) | | | | | | | 0.90 |
| Additive | (B-1) | 0.05 | 0.05 | 0.05 | 0.10 | | 0.05 | 0.05 |
| | (B-2) | | | | | 0.05 | | |
| | (B-3) | | | | | | | |
| | (B-4) | | | | | | | |
| Positive electrode mixture | | | | | | | | |
| Viscosity change | % | 135 | 106 | 111 | 110 | 135 | 138 | 128 |
| Positive electrode | | | | | | | | |
| Peeling test | N/cm | 0.153 | 0.180 | 0.179 | 0.038 | 0.161 | 0.160 | 0.182 |
| Flexibility test | φ3.5 | Good | Good | Good | Good | Good | Good | Good |
| | φ3.0 | Good | Good | Good | Good | Good | Good | Good |
| | φ2.5 | Good | Good | Good | Good | Good | Good | Good |

| | | Experimental Example 8 | Experimental Example 9 | Experimental Example 10 | Comparative Example 1 | Comparative Example 2 | Comparative Example 3 | Comparative Example 4 |
|---|---|---|---|---|---|---|---|---|
| Compositional features of positive electrode mixture (parts by mass) | | | | | | | | |
| Positive electrode active material | NMC811 | | 100 | 100 | 100 | 100 | | 100 |
| | NMC622 | | | | | | | |
| | LCO | 100 | | | | | | |
| | LFP | | | | | | 100 | |
| Fluorine-containing copolymer | (A-1) | | 0.23 | | | 0.23 | 0.20 | 0.23 |
| | (A-2) | 0.23 | | | | | | |
| | (A-3) | 0.90 | 0.90 | | 1.13 | 0.90 | 0.82 | 0.90 |

TABLE 1-continued

| | | | | | | | | |
|---|---|---|---|---|---|---|---|---|
| of PVdF | (A-4) | | | | | | | |
| | (A-5) | | | 1.13 | | | | |
| | (A-6) | | | | | | | |
| Additive | (B-1) | 0.05 | | 0.05 | 0.05 | | | |
| | (B-2) | | | | | | | |
| | (B-3) | | 0.05 | | | | | |
| | (B-4) | | | | | | | 0.05 |
| Positive electrode mixture | | | | | | | | |
| Viscosity change | % | 100 | 85 | 72 | 610 | 147 | 120 | 262 |
| Positive electrode | | | | | | | | |
| Peeling test | N/cm | 0.161 | 0.131 | 0.172 | 0.212 | 0.025 | 0.032 | 0.056 |
| Flexibility test | ϕ3.5 | Good | Good | Good | Good | Good | Good | Good |
| | ϕ3.0 | Good | Good | Good | Poor | Good | Good | Good |
| | ϕ2.5 | Good | Good | Poor | Poor | Good | Good | Good |

TABLE 2

| | | Production Example 1 | Production Example 2 | Production Example 3 | Production Example 4 |
|---|---|---|---|---|---|
| Compositional features of positive electrode mixture | | | | | |
| Positive electrode active material | NMC811 | | | | |
| | NMC622 | 100 | 100 | 100 | 100 |
| | LCO | | | | |
| | LFP | | | | |
| Fluorine-containing copolymer or PVdF | (A-1) | 0.23 | 0.23 | | 0.23 |
| | (A-2) | | | | |
| | (A-3) | 0.90 | 0.90 | 1.13 | 0.90 |
| | (A-4) | | | | |
| | (A-5) | | | | |
| | (A-6) | | | | |
| Additive | (B-1) | 0.05 | | 0.05 | |
| | (B-2) | | | | |
| | (B-3) | | 0.05 | | |
| | (B-4) | | | | |
| Battery | | | | | |
| Load characteristics | % | 57.6 | 58.8 | 59.0 | 56.7 |

The invention claimed is:

1. An electrode mixture comprising: an electrode active material; an organic solvent; a binder; and an additive, wherein the binder comprises a fluorine-containing copolymer comprising a vinylidene fluoride unit and a fluorinated monomer unit, provided that the vinylidene fluoride unit is excluded from the fluorinated monomer unit; and a polyvinylidene fluoride, the additive is a polymer material containing the following repeating unit:

$$—[CH_2—CHR]—$$

wherein R represents a chain or cyclic amide group, a nitrile group, or a substituted alkyl group formed by substituting at least one of hydrogen atoms of an alkyl group having 1 to 4 carbon atoms with a chain or cyclic amide group or a nitrile group, a content of the binder is 0.1 to 1.6 parts by mass with respect to 100 parts by mass of the electrode active material, a content of the additive is 0.001 to 0.2 parts by mass with respect to 100 parts by mass of the electrode active material, a content of the vinylidene fluoride unit in the fluorine-containing copolymer is 50.0 to 99.0 mol % with respect to all monomer units, and a content of vinylidene fluoride unit in the polyvinylidene fluoride is more than 99.0 mol % with respect to all monomer units.

2. The electrode mixture according to claim 1, wherein the fluorinated monomer unit is at least one selected from the group consisting of a tetrafluoroethylene unit, a chlorotrifluoroethylene unit, a fluoroalkyl vinyl ether unit and a hexafluoropropylene unit.

3. The electrode mixture according to claim 1, wherein the additive is at least one selected from the group consisting of a polyvinylpyrrolidone and a polyacrylonitrile.

4. The electrode mixture according to claim 1, wherein the additive is a polyvinylpyrrolidone.

5. The electrode mixture according to claim 1, wherein the electrode active material is at least one selected from the group consisting of a lithium-containing transition metal composite oxide and a lithium-containing transition metal phosphate compound.

6. The electrode mixture according to claim 1, wherein a mass ratio of the polyvinylidene fluoride to the fluorine-containing copolymer, polyvinylidene fluoride/fluorine-containing copolymer, in the binder is 90/10 to 50/50.

7. An electrode comprising:

a current collector; and an electrode mixture layer provided on one side or each of both sides of the current collector and formed by the electrode mixture according to claim 1.

8. A secondary battery comprising the electrode according to claim 7.

9. A composition comprising:

a fluorine-containing copolymer comprising a vinylidene fluoride unit and a tetrafluoroethylene unit;

a polyvinylidene fluoride; and a polymer material, as an additive, comprising the following repeating unit:

$$—[CH_2—CHR]—$$

wherein R represents a chain or cyclic amide group, a nitrile group, or a substituted alkyl group formed by substituting at least one of hydrogen atoms of an alkyl group having 1 to 4 carbon atoms with a chain or cyclic amide group or a nitrile group, wherein a content of the vinylidene fluoride unit in the fluorine-containing copolymer is 50.0 to 99.0 mol % with respect to all monomer units, and a content of vinylidene fluoride unit in the polyvinylidene fluoride is more than 99.0 mol % with respect to all monomer units.

10. The composition according to claim 9, wherein a mass ratio of the fluorine-containing copolymer (a) to the additive (b), a/b, is 1/99 to 99/1.

11. The composition according to claim 9, further comprising an organic solvent.

* * * * *